United States Patent [19]

Osanai

[11] 4,231,268
[45] Nov. 4, 1980

[54] FLYWHEEL FOR SMALL SIZE TAPE RECORDER

[75] Inventor: Akira Osanai, Hachioji, Japan

[73] Assignee: Olympus Optical Co., Ltd., Tokyo, Japan

[21] Appl. No.: 819,368

[22] Filed: Jul. 27, 1977

[30] Foreign Application Priority Data

Jul. 30, 1976 [JP] Japan .................................. 51/91153

[51] Int. Cl.³ .............................................. G05G 3/00
[52] U.S. Cl. ...................................... 74/572; 74/202; 74/206
[58] Field of Search ................. 74/572, 202, 206, 214, 74/194, 196, 572; 242/201; 199/200; 226/188; 308/166

[56] References Cited

U.S. PATENT DOCUMENTS

| | | | |
|---|---|---|---|
| 1,447,390 | 3/1923 | Kucharski | 74/572 X |
| 1,881,393 | 10/1932 | Wood | 74/572 |
| 2,467,261 | 4/1949 | Hubrough | 74/206 |
| 2,470,435 | 5/1949 | Gold | 74/572 X |
| 2,576,250 | 11/1951 | Brubaker | 74/572 X |
| 2,647,408 | 8/1953 | Manning | 74/572 X |
| 2,942,488 | 6/1960 | Faulkner | 74/572 X |
| 3,082,635 | 3/1963 | Grado | 74/572 X |
| 3,319,478 | 5/1967 | Gruber | 74/202 |
| 3,439,558 | 4/1969 | Watanabe | 74/573 |
| 3,788,162 | 1/1974 | Rabenhorst et al. | 74/572 |
| 3,915,410 | 10/1975 | Perry et al. | 242/201 |
| 3,965,762 | 6/1976 | Nessel | 74/206 |

OTHER PUBLICATIONS

Japanese Published Utility Model application Nos. SHO-51/11935, SHO-52/22964.

*Primary Examiner*—Samuel Scott
*Assistant Examiner*—Randall L. Green
*Attorney, Agent, or Firm*—Weinstein & Sutton

[57] ABSTRACT

A flywheel for small size tape recorders is disposed in peripheral frictional engagement with an output wheel of a motor for rotation in the opposite direction from the latter. The ratio of moment of inertia of the rotating motor portion about the output shaft to the moment of inertia of the flywheel about its support shaft is chosen equal to the reciprocal of the ratio of their angular velocities, thereby causing a substantial balancing of the angular momentum of each other.

5 Claims, 4 Drawing Figures

FLYWHEEL FOR SMALL SIZE TAPE RECORDER

BACKGROUND OF THE INVENTION

The invention relates to a flywheel for small size tape recorders.

A tape drive mechanism for a small size tape recorder generally comprises a capstan for transporting a tape at a uniform rate, a flywheel for rotating the capstan at a uniform rate, a drive motor, and a transmission disposed between the motor and the flywheel. A miniature motor used as a drive source in a tape recorder has a rotor with a very large moment of inertia, and a flywheel also has a very large moment of inertia in order to achieve a uniform rotational speed of the capstan. When an idle pulley is interposed between these components, which have an increased moment of inertia, in order to permit their rotation in the same direction, inconveniences are caused in that a greater starting torque is required of the motor or an increased braking effort must be applied to stop the capstan.

In particular, with a tape recorder of miniature size which employs a micro-cassette tape and which is adapted to be gripped by hand during use, any swinging motion of the recorder which is very likely to occur may add the influence of external forces to the angular momentum of the motor rotor and the flywheel. Some means must be provided therefore to compensate for any variation in the angular momentum in order to assure a satisfactory recording response. If an idle pulley is used which rotates in the opposite direction from the rotor and the flywheel, the diameter of such idle pulley would be limited by design considerations, and the limited diameter of the idle pulley makes it almost impossible to achieve a full compensation.

SUMMARY OF THE INVENTION

It is a first object of the invention to provide a flywheel for a small size tape recorder which is peripherally engaged with an output wheel of a motor and which is designed to exhibit a moment of inertia having a given relationship with the moment of inertia of the motor, thereby overcoming the difficulty of the prior art.

It is a second object of the invention to provide a flywheel for a small size tape recorder of the kind described which includes a rubber ring fitted into the periphery of the flywheel to increase the friction between the output wheel and the flywheel.

It is a third object of the invention to provide a flywheel for a small size tape recorder which is molded from synthetic resin integrally with or mechanically coupled with a hollow shaft capstan, thereby reducing the number of parts and the space requirement therefor.

DESCRIPTION OF PREFERRED EMBODIMENTS

Figure 1:
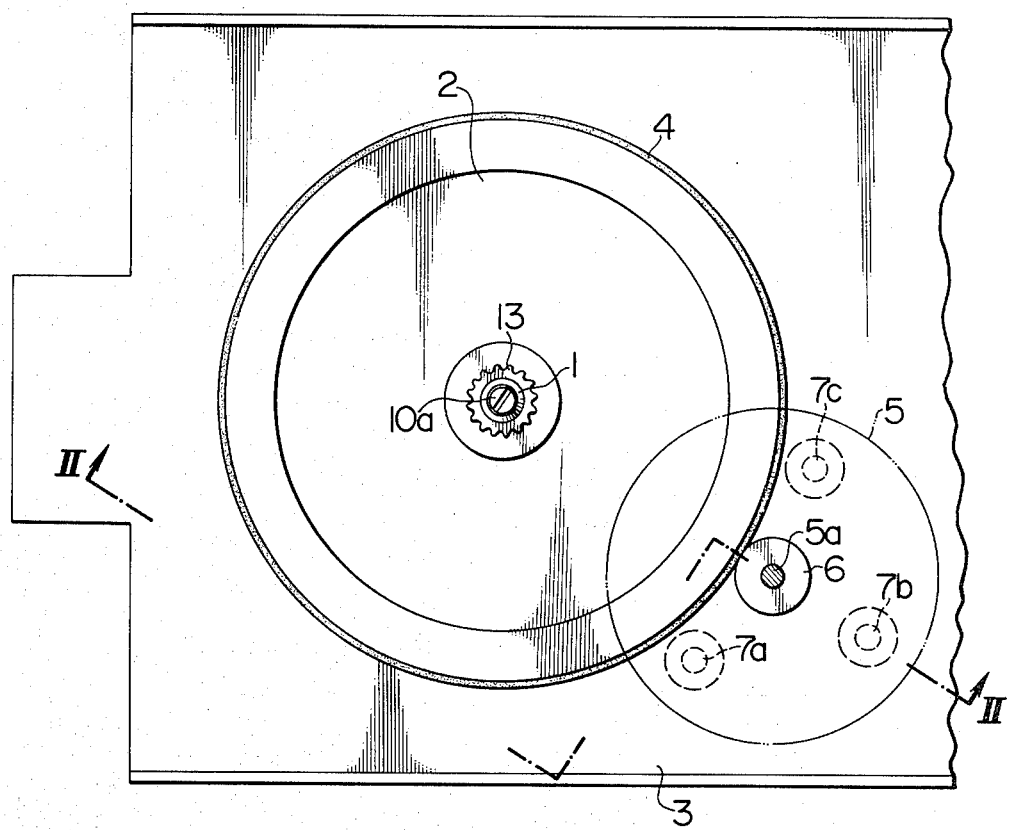
FIG. 1 is a top view of the flywheel for small size tape recorder constructed in accordance with one embodiment of the invention.
Figure 2:
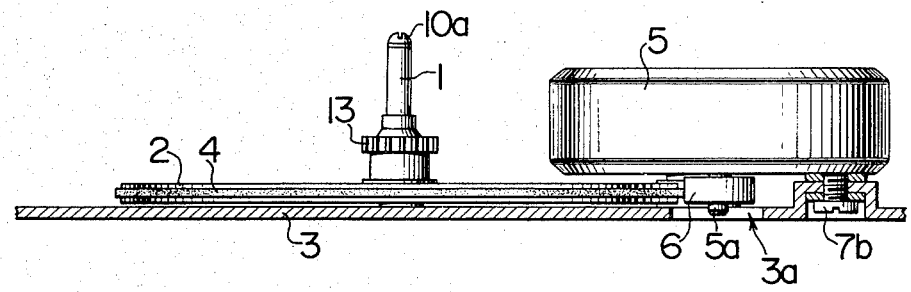
FIG. 2 is an elevational section taken along the line II—II shown in FIG. 1.

Referring to FIGS. 1 and 2, there is shown a flywheel constructed in accordance with the invention. Specifically, there is shown a miniature motor 5 for driving a tape in a tape recorder. The motor is mounted on a support plate 3 by set screws 7a, 7b, 7c with its output shaft 5a extending downward into an opening 3a (FIG. 2) formed in the plate 3. An output wheel 6 is fixedly mounted on the shaft 5a and is in closed (i.e. firm) engagement with a frictional transmission member 4 such as rubber ring which is applied to the peripheral surface of a flywheel 2.

In the example shown, a capstan 1 is formed integrally with the flywheel 2 for coaxial rotation, and is disposed in parallel relationship with the output shaft 5a of the motor 5. In such an arrangement, the moment of inertia of the rotating portion of the motor 5 inclusive of the output wheel 6 about the shaft 5a, the moment of inertia of the flywheel 2 about its support shaft, and the relative direction of rotation of the output wheel 6 and the flywheel 2 have a complex relationship among them, which is avoided by providing a direct coupling between the output wheel and the flywheel, which thus rotate in opposite directions from each other. Rotation in the opposite directions permits a cancellation of the moments of inertia if they have a substantial magnitude.

In accordance with the invention, the size and weight of the flywheel are chosen so that the following relation applies;

$$I_M \times \omega_M = I_F \times \omega_F$$

or $$I_F = I_M \times n$$

where $I_M$ represents the moment of inertia of the rotating portion of the motor inclusive of the output wheel 6 about the shaft 5a, $I_F$ that of the flywheel, $\omega_M$ and $\omega_F$ the angular velocity of the output wheel 5a and the flywheel 2, respectively, and n the ratio therebetween which is equal to $\omega_M/\omega_F$. The equal angular momentum of the motor and the flywheel, coupled with their rotation in opposite directions, permits a substantial balancing of the respective angular momenta, thereby enabling the starting torque or the braking effort required upon stopping to be reduced.

If an external force is applied to the flywheel 2 to cause a change $\Delta\omega_F$ in its angular velocity, the resulting change $\Delta\omega_M$ in the angular velocity of the output shaft 5a is calculated as follows;

$$\Delta\omega_F = \Delta\omega_M \times (1/n)$$

Hence, $$I_F \times (\omega_F + \Delta\omega_F) = I_M \times n \times (\omega_M \times (1/n) + \Delta\omega_M \times (1n)) = I_M \times (\omega_M + \Delta\omega_M)$$

In other words, the equality between the angular momentum of the motor and the flywheel is maintained in the presence of the influence of an external force, still permitting their substantial balancing. As a result, the arrangement of the invention permits the rotational speed of the capstan to be maintained constant, minimizing the wow or flutter.

Figure 3:
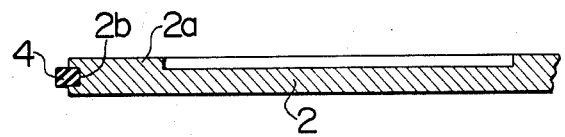
FIG. 3 is a fragmentary view in elevational section of the flywheel.

As shown in FIG. 3, the flywheel 2 is peripherally formed with a groove 2b into which is fitted the transmission member 4, which may comprise a rubber ring, for example, having an increased coefficient of friction. The member 4 as prepared has a perimeter which is slightly less than the circumferential length of the flywheel, and is fitted into the groove by stretching it. This assures a strong frictional engagement while simplifying the required process than when a frictional member is staked around the periphery of the flywheel.

Figure 4:
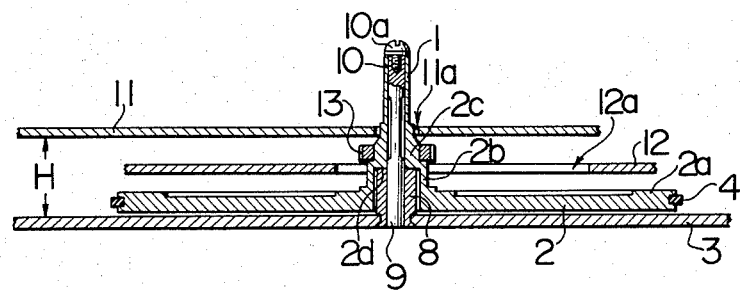
FIG. 4 is an elevational section of another flywheel which is molded from synthetic resin integrally with a hollow shaft capstan.

As shown in FIG. 4, the flywheel 2 is molded from synthetic resin integrally with the capstan 1. The flywheel is centrally formed with an integral hub 2b extending upward therefrom, with a step 2c formed above the hub and which is contiguous with an upwardly extending hollow shaft of a reduced diameter, the hollow shaft constituting the capstan 1. The capstan 1 and the flywheel 2 are fitted closely over a support shaft 9 secured to the support plate 3, with a bearing 8 interposed between the hub and the shaft 9 to make the flywheel rotatable relative to the latter. An upper interior surface 2d of the hub 2b rests on the top end face of the bearing 8 to prevent a downward movement of the flywheel. The top end of the shaft 9 is internally threaded to receive a locking screw 10 having a dished head 10a, which bears against the top end of the capstan 1 to prevent its upward movement.

In the region of a cassette receiving chamber, a panel 11 in the recorder is formed with an opening 11a, through which the capstan 1 extends into the chamber. A stationary baseplate 12 is located intermediate the panel 11 and the support plate 3 and fixedly mounted on the latter, with an opening 12a formed therein to pass the hub 2b therethrough. The step 2c is located slightly above the upper surface of the baseplate 12, and has a small diameter drive gear 13 rigidly mounted thereon as by shrinkage fit for driving a tape supply or rewind shaft.

The above construction of the capstan 1 as a hollow shaft integral with the flywheel 2 enable a substantial reduction in the spacing H (FIG. 4) between the panel 11 and the support plate 3 and hence in the thickness of the tape recorder. Another advantage occurs from the fact that the shaft 9 is located to counter the pressure exerted upon the capstan 1 by a pinch roller, not shown, thus effectively avoiding a tilting of the capstan and preventing undue stresses from being applied to the bearing.

The integral molding of the capstan and the flywheel is not essential. Instead, the capstan may be formed by a pipe of a reduced diameter and integrally joined with the flywheel for the ease of mass production.

What is claimed is:

1. A flywheel for a small size tape recorder, the flywheel being directly engaged at its periphery by an output wheel of a motor, the output wheel rotating about an axis which is substantially parallel to the axis of rotation of the flywheel so that upon rotation of the output wheel in one direction the flywheel rotates in an opposite direction, the flywheel being constructed to satisfy the following relationship;

$$I_F = I_M \times n$$

where $I_M$ represents the moment of inertia of the motor about its output shaft, $I_F$ the moment of inertia of the flywheel, and n the ratio $W_M/W_F$ wherein $W_M$ and $W_F$ represent the angular velocity of the output shaft of the motor and the flywheel, respectively, whereby the angular momentum of the flywheel substantially balances the angular momentum of the output wheel.

2. A flywheel according to claim 1 in which the flywheel is formed with a peripheral groove into which a rubber ring as a frictional transmission member is tightly fitted for engagement with the output wheel.

3. A flywheel according to claim 1, further comprising a capstan integrally joined thereto and formed by a hollow shaft of a small diameter, a hub centrally formed in the flywheel, and a bearing received in the hub for rotatably carrying the flywheel.

4. The apparatus of claim 3 wherein the shaft, hub and flywheel are all integrally formed of a synthetic resin.

5. The apparatus of claim 3 further comprising a gear mounted between said hub and said shaft for driving a tape winding shaft.

* * * * *

UNITED STATES PATENT AND TRADEMARK OFFICE
CERTIFICATE OF CORRECTION

PATENT NO. : 4,231,268
DATED : November 4, 1980
INVENTOR(S) : Akira Osanai

It is certified that error appears in the above—identified patent and that said Letters Patent is hereby corrected as shown below:

Column 2, line 59, change "(1n)" to --(1/n)--.

Signed and Sealed this

Twenty-first Day of April 1981

[SEAL]

Attest:

RENE D. TEGTMEYER

Attesting Officer        Acting Commissioner of Patents and Trademarks